United States Patent [19]
Shmidt et al.

[11] Patent Number: 5,160,784
[45] Date of Patent: Nov. 3, 1992

[54] FIRE-RESISTANT THERMOPLASTIC COMPOSITE STRUCTURE

[75] Inventors: Creston D. Shmidt, Nashport; William G. Stobby, Johnstown, both of Ohio

[73] Assignee: The Dow Chemical Company, Midland, Mich.

[21] Appl. No.: 724,570

[22] Filed: Jun. 28, 1991

[51] Int. Cl.$^5$ .............................................. B32B 3/26
[52] U.S. Cl. ............................. 428/316.6; 428/319.7; 428/319.9; 428/910; 428/921
[58] Field of Search ............... 428/316.6, 319.3, 319.7, 428/319.9, 910, 921

[56] References Cited

U.S. PATENT DOCUMENTS

| | | | |
|---|---|---|---|
| 3,645,837 | 2/1972 | Chisholm et al. | 264/171 |
| 4,331,725 | 5/1982 | Akao | 428/319.9 |
| 4,784,906 | 11/1988 | Akao | 428/324 |
| 4,818,603 | 4/1989 | Mueller | 428/316.6 |
| 4,889,669 | 12/1989 | Suzuki | 264/45.9 |

FOREIGN PATENT DOCUMENTS 53-66986  6/1978  Japan .

Primary Examiner—William J. Van Balen
Attorney, Agent, or Firm—J. Robert Dean, Jr.

[57] ABSTRACT

Disclosed is a coextruded, fire-resistant, composite structure of adjacent, alternating first and second layers wherein the first layer comprises a thermoplastic foam and second layer a thermoplastic material with such second layers containing a quantity of a brominated fire retardant sufficient to enhance the flame retardancy of the composite structure. Incorporation of the fire retardant into the thermoplastic material layers allows a fire-resistant foam structure to be made using water as a blowing agent for the first layers while avoiding serious corrosion problems encountered when incorporating both brominated fire retardants and water in the same foam structure. Further disclosed are processes for making the above described composite structure. Further disclosed is a composite flow melt expandable into the above-described composite structure.

10 Claims, No Drawings

FIRE-RESISTANT THERMOPLASTIC COMPOSITE STRUCTURE

BACKGROUND OF THE INVENTION

The invention relates to a fire-retardant foam composite structure with a layer or layers having incorporated therein a brominated fire retardant.

Brominated compounds are commonly added to thermoplastic foams, particularly polystyrene foams, to enhance flame retardancy. Brominated compounds typically extinguish fire by decomposing and evolving bromine-containing gas upon exposure to high levels of heat or flames.

Brominated fire retardants have a tendency to form acidic decomposition products when exposed to elevated temperatures such as those encountered in thermoplastic foaming processes. These acidic decomposition products are usually not a problem unless they come into contact with water during the processing of molten thermoplastic resin prior to foaming of the resin. One instance when this may occur is when water is used as a primary or auxiliary blowing agent. Contact between the acidic decomposition products and the water blowing agent in the molten expandable thermoplastic resin causes the resin to be acidic and corrosive; this corrosiveness requires that expensive, acid-resistant equipment be used to make and process the expandable thermoplastic resin.

One solution to avoid the foam corrosiveness problem is to simply not use water as a blowing agent. Using water is desirable however, because water is inexpensive and environmentally friendly. Another solution would be to use a fire retardant that does not create acidic decomposition products like brominated compounds can. Replacement of brominated compounds is not desirable however, because they have proven to be both very effective and economical in use as fire retardants in thermoplastic foams.

Since it is desirable to use brominated compounds as fire retardants and water as a blowing agent in thermoplastic foams, it would be desirable to have a fire-resistant foam so structured to allow both to be used. It would be further desirable to have such a foam which can be processed without special manufacturing equipment, and which is both relatively simple and economical to make.

SUMMARY OF THE INVENTION

According to the present invention, there is a coextruded, fire-resistant, composite structure comprising: a) a first layer of a thermoplastic foam which has a blowing agent comprising water, and is substantially free of brominated fire retardants; and b) a second layer of a thermoplastic material which has a quantity of a brominated fire retardant sufficient to reduce the flammability of the composite structure to proper fire code standards. Incorporation of the flame retardant into the second layer imparts sufficient desired flame retardancy to the composite structure while allowing the first thermoplastic foam layer to be free or substantially free of the flame retardant. The first and second layers are adjacent and cohesive with respect to each other. The second layer is preferably substantially noncellular or unfoamed, and most preferably takes the form of a film. Preferably, the composite structure is comprised of a plurality of alternating first and second layers. Preferably, the outer layers of the composite structure comprise second layers of a thermoplastic material having fire retardant incorporated therein.

Further according to the present invention, there is a composite thermoplastic flow melt suitable for expansion into a composite foam structure comprising a) a first stream layer of a flow melt of a thermoplastic material and b) a second stream layer of a flow melt of a thermoplastic material. The first stream layer has a blowing agent comprising water and is substantially free of brominated aliphatic fire retardants. The second stream layer is substantially free of water, and has a quantity of a brominated fire retardant sufficient to reduce the flammability of a composite structure made from the composite flow melt. The incorporation of the fire retardant into a stream layer (the second stream layer) free of water blowing agent allows the retardant to be incorporated into the composite flow melt without rendering it corrosive to processing and manufacturing equipment. The first and second stream layers are adjacent each other. The composite flow melt preferably comprises a plurality of substantially alternating first and second stream layers.

Further according to the present invention, there is a process for making a coextruded fire-resistant composite structure comprising:

(a) providing a first thermoplastic melt stream having incorporated therein a blowing agent comprising water under an elevated pressure sufficient to prevent the expansion of the first stream, (b) providing a second thermoplastic melt stream having incorporated therein a brominated fire retardant and being substantially free of water, (c) integrating the first and second streams to form a composite melt stream, and (d) extruding the composite stream through a die to a zone of lower pressure to form a stable composite structure comprising a first layer of a thermoplastic foam and a second layer of a thermoplastic material.

Further according to the present invention, there is another method for making the present composite structure comprising a) expanding the above-described first thermoplastic melt stream to form a first layer of thermoplastic foam and b) applying the above-described second thermoplastic melt stream to the first layer of thermoplastic foam to form a second layer of a thermoplastic material adjacent to the first layer to form the present composite structure. This process embraces extrusion and post-lamination processes as opposed to coextrusion processes.

DETAILED DESCRIPTION

The present coxtruded, fire-resistant, composite structure is made up of at least one first layer of a thermoplastic foam and at least one second layer of a thermoplastic material. The present composite structure is advantageous because it can be made using water as a primary or auxiliary blowing agent and common brominated aliphatic fire retardants. The first layer or layers are expanded completely or in part with the water blowing agent in the absence of the brominated fire retardant. The brominated fire retardant is incorporated into the second layer or layers which are coextruded with the first layer or layers in the absence of water. Thus, an advantageous composite foam structure may be produced without the corrosion problems encountered in processing expandable thermoplastic melts having both water blowing agents and brominated aliphatic fire retardants.

The total number of first and second layers is at least 2, preferably at least 3, and most preferably from 3 to 1,000. The first and second layers are generally parallel and in stacked relationship with one another. The first and second layers preferably alternate consecutively along the stack of layers, but may merely substantially alternate consecutively in that first layers may abut each other or second layers may abut each other occasionally through the stack. Preferably, the outer layers (the top and bottom of the stack) of the composite structure are second layers having a brominated aliphatic fire retardant incorporated therein to further enhance the flame retardancy of the structure. Further preferably, the first layer or layers comprise the majority of the composite structure on both a volume and a weight basis.

The first and second layers typically are heat fused to each other, but also may be adhered to each other by intermediary layers made of tacky plastics such as ethylene-vinyl acetate copolymers, ethylene-acrylic acid copolymers, ethylene-propylene copolymers, urethanes, and the like. Preferably, the first and second layers will be heat fused to each other as contemplated in coextruded structures. When the first and second layers are referred to as being adjacent and cohesive with respect to each other, this is inclusive of the layers being fused together or being adhered by tacky intermediate layers.

The second layers preferably take the form of a film and are substantially noncellular or unfoamed. The thickness of each of the film layers is not critical, but is preferably from about 1 micron to about 2 millimeters and more preferably from about 3 microns to about 1 millimeter. It is understood that the film layers may also take the form of thin sheets. Alternately, the second layers may take the form of a foam to reduce the density of such layers.

The first and second layers may be comprised of the same or different thermoplastic materials. Suitable thermoplastic materials may be selected from any of those which can be formed into film or blown into foam. Suitable thermoplastics include polyolefins such as polyethylene and polypropylene, polyvinylchloride, polystyrene, cellulosic polymers, polycarbonates, polyetherimides, polyamides, polyesters, polyvinylidene chloride, polymethylmethacrylate, and the like. Suitable polyolefins include polyethylene, polypropylene and polybutylene. The present invention is particularly useful with composite structures comprised of polystyrene, which may be formed into both a film and a foam, because brominated fire retardants are commonly employed in polystyrene foams.

Fire retardants useful in the present composite structure include any brominated aliphatic compound heretofore employed as a flame retardant in thermoplastic resins and foam compositions provided such compounds have at least one hydrogen atom attached to a carbon atom which is adjacent to a carbon atom containing at least one bromine atom. Representative brominated aliphatic compounds include, but are not limited to, hexabromocyclododecane; tris (2,3-dibromo-propyl)phosphate; tetrabromo-vinylcyclohexene; tetrabromocyclooctane; pentabromo-chlorocyclohexane; 1,2-dibromo-methyl)cyclohexane; hexabromo-2-butene; and 1,1,1,3-tetrabromononane. Particularly preferred brominated aliphatic flame retardant compounds include hexabromocyclododecane and its isomers, pentabromocyclohexane, and its isomers. Other suitable brominated fire retardant compounds include tribromodiphenyl ether, tetrabromodiphenyl ether, pentabromodiphenyl ether, hexabromodiphenyl ether, tribromochlorodiphenyl ether, tribromodichlorodiphenyl ether, trichlorodiphenyl ether, tetrabromodichlorodiphenyl ether, octobromodiphenyl ether, decabromodiphenyl ether, the 2-ethylhexyl, n-octyl, nonyl, butyl, dodecyl and 2,3-dioxypropyl ethers of tribromophenyl, tribromochlorophenyl, tribromodichlorophenyl, tetrabromobisphenol A, dioctyl ester of tetrabromophthalic acid. The fire retardant may comprise a mixture of one or more brominated fire retardants.

The brominated fire retardant preferably comprises between about 0.2 and about 10.0 and more preferably between about 0.6 and about 2.5 weight percent elemental bromine based upon the total weight of thermoplastic material in the composite structure.

Whether the second layer is in film or foam form, it further preferably contains a melt flow modifier, which enhances the flame retardancy of the composite structure and allows the same level of flame retardancy to be obtained with a lesser amount of the brominated flame retardant. Suitable melt flow modifiers include, but are not limited to, 2,3-dimethyl-2,3-diphenylbutane; bis(alpha-phenylethyl)sulfone; 1,1-diphenylbicyclohexyl; 2,2'-dimethyl-2,2'-azobutane(19694-12-3); 2,2'-dichloro-2,2'-azobutane(52406-48-1); 2,2'-dibromo-2,2'-azobutane(56375-36-1); 2,2'-dimethyl-2,2'-azobutane-3,3',4,4'-tetracarboxylic acid(58657-67-3); 1,1'-diphenylbicyclopentyl; 2,5-bis(tribromomethyl)-1,3,4-thiadiazole; dioctyl tin maleate; dibutyl tin maleate; and bis allyl ethers of bisphenol A or of tetrabromobisphenol A.

The present structure may contains additional additives such as pigments, fillers, antioxidants, nucleating agents, stabilizing agents, antistatic agents, acid scavengers, or the like.

The present composite structure may have an overall density ranging from about 3.2 to about 320 and more preferably about 15.1 to about 150 kilograms per cubic meter.

The process of the present invention for making the composite structure generally comprises providing a first thermoplastic melt stream, providing a second thermoplastic melt stream having incorporated therein a brominated fire retardant, integrating the first and second streams to form a composite stream, extruding the composite stream through a die to a zone of lower pressure to form the composite structure.

The first thermoplastic melt stream is generally formed by melting a thermoplastic material and incorporating therein a blowing agent comprised partly or completely of water. The blowing agent may be incorporated or blended into the thermoplastic melt by any means known in the art such as with an extruder, mixer, blender, or the like. Prior to blending with the blowing agent, the thermoplastic material is heated to a temperature at or above the glass transition temperature and preferably above the melting point of the thermoplastic material. The blowing agent is blended with the thermoplastic melt at an elevated pressure sufficient to prevent substantial expansion of the melt or loss of generally homogenous dispersion of the blowing agent within the melt. Such a pressure is typically at least above 345 kilopascals gauge and more preferably above 6900 kilopascals gauge. The blowing agent is incorporated into the first thermoplastic melt stream in a weight proportion of between about 1 to about 30 parts and preferably from 5 to 15 parts per hundred parts of the thermoplastic material to be expanded.

Blowing agents which optionally may be incorporated along with water in the first thermoplastic melt to make the first layer or layers of the present composite structure are described below. If it is desired that the second layer or layers of the present structure be cellular or foamed, the following blowing agents may be incorporated into the second thermoplastic melt so long as the blowing agent neither includes nor produces water. Useful blowing agents other than water include gaseous materials, volatile liquids, and chemical agents which decompose into a gas or other byproducts. Suitable blowing agents include, but are not limited to nitrogen, carbon dioxide, air, argon, methyl chloride, ethyl chloride, butane, isobutane, pentane, isopentane, perfluoromethane, 1,1-difluoroethane, 1,1-dichloro-2,2-difluoroethane, 1,1,1,2-tetrafluoroethane, chloro-trifluoromethane, dichlorodifluoromethane, trichlorofluoromethane, perfluoroethane, 1-chloro-1,1-difluoroethane, chloropentafluoroethane, dichlorotetrafluoroethane, trichlorotrifluoroethane, perfluoropropane, chlorheptafluoropropane, dichlorohexafluoropropane, perfluorobutane, chlorononafluorobutane, perfluorocyclobutane, azodicarbonamide, azodiisobutyronitrile, benzenesulfonhydrazide, 4,4-oxybenzene sulfonylsemicarbazide, p-toluene sulfonyl semicarbazide, barium azodicarboxylate, N,N'-dimethyl-N,N'-dinitrosoterephthalamide, and trihydrazino triazine. The blowing agent may comprise a mixture of two or more blowing agents.

The formation of a second thermoplastic melt stream suitable for extrusion into a film is carried out by melting a thermoplastic material in the manner described above for the first stream and incorporating therein a brominated aliphatic fire retardant. The brominated fire retardant may be dry mixed with the thermoplastic and subsequently melting and blended together, or may be mixed with the thermoplastic melt. The thermoplastic and the brominated fire retardant may be blended by any means known in the art such as with an extruder, mixer, blender, or the like. The second thermoplastic melt stream is substantially free of and preferably completely free of water regardless of whether or not another blowing agent is incorporated therein.

Following the incorporation of the blowing agent comprising water in to the first melt stream and the brominated fire retardant into the second melt stream, the two streams are integrated to form a composite stream. The composite stream is then extruded through a die to a zone of lower pressure to form the stable composite structure of the present invention. The zone of lower pressure downstream of the die is a pressure lower than that which the first stream or the second stream if it contains a blowing agent were exposed to prevent such stream from expanding or losing their blowing agents. The stable composite structure is comprised of foamed thermoplastic first layers and thermoplastic foamed or unfoamed (film) second layers fused together or otherwise adhered together.

The first and second streams are integrated together and extruded by means of coextrusion or simultaneous extrusion well-known in the art. Methods and apparatuses for coextrusion are disclosed in U.S. Pat. Nos. 3,565,985, 3,557,265, and 3,884,606, all of which are incorporated herein by reference. Such methods and apparatuses may be used to create composite structures of up to several hundred layers. During coextrusion, the first and second melt streams are both divided or split into a plurality of first and second melt substreams. The plurality of substreams is then arranged and integrated to form a composite flow melt of a stack of substantially alternating first and second substream layers. The composite flow melt is then extruded through a die to a region of lower pressure to form a composite structure of first sublayers of a foam of a plastic material and second sublayers of a plastic material wherein the sublayers are fused or otherwise adhered together. The second sublayers may or may not be foamed depending upon the presence of a blowing agent in the second melt substreams. For purposes of convenience, the first and second substream layers are referred to herein as first and second stream layers, and the first and second sublayers are referred to herein as first and second layers. Preferred methods and apparatuses for making the present composite structures are seen in U.S. Ser. No. 577,723 filed Sep. 5, 1990, which is incorporated herein by reference.

It is understood that a noncoextruded composite structure of the present invention may be made by conventional lamination or coating methods. For instance, a coextruded or molded bead plastic foam which is substantially free of brominated fire retardant and is formed with a blowing agent comprising water could be laminated with another plastic foam or film containing brominated fire retardant. Likewise, a resin or melt containing brominated fire retardant could be coated or spread or otherwise applied to a plastic foam substrate which is substantially free of brominated fire retardant and formed with a blowing agent comprising water.

The following examples are presented to illustrate the invention, and are not to be construed as limiting.

EXAMPLES

Nine layer film/foam composite structures of alternating film and foam layers with 5 film layers and 4 foam layers and outer layers of film were prepared according to the present invention. Both the film and foam layers were prepared from STYRON 680 brand polystyrene (The Dow Chemical Company) of 200,000 weight average molecular weight and a melt index of 11.4 g/10 min (500 g at 230° C.). The foam-forming melt stream was prepared by melting and blending the polystyrene; 1-chloro-1,1-difluoroethane (CFC-142b) as the blowing agent; talc as the nucleator; and blue colorant Phthalocyanin Blue in a 3.8 cm Killon extruder operating at 1.14 kg/hour. The blowing agent was added in a mixer downstream of the extruder. The proportion of CFC-142b and talc in the foam-forming melt stream was 10 parts per hundred (pph) and 1 pph based upon the weight of the polystyrene, respectively. The process conditions of temperature and absolute pressure in the Killon Extruder and subsequent process equipment were as follows: 170° C. in zone 1, 180° C. in zone 2, 200° C. in zone 3, 200° C. in zone 4, 200° C. in the gear pump, and 200° C. in the mixer, and 140° C. in the cooler. The film-forming melt stream was prepared by melting and blending in a 3.2 cm Yellow Jacket extruder the polystyrene and varying proportions of hexabromocyclododecane (HBCD) depending upon the sample. The Yellow Jacket Extruder operated at 1.14 kg/hour, and had process conditions of 170° C. in zone 1, 180° C. in zone 2, 200° C. in zone 3, and 200° C. in zone 4. A cooler situated after the extruder had process conditions of 170° C. Samples 4–6 of the Table represent composite structures with varying bromine levels.

The foam-forming and film-forming melt streams were each split into substreams, integrated in an alternating sequence, and then coextruded through a nine-layer die to form the nine-layer structures. The die conditions were 133° C. and 12,400 kPa.

Control structures having nine foam layers and no film layers were prepared under the substantially the same conditions as for the composite structures above. 10 pph CFC-142b, 1 pph talc and the indicated HBCD proportions were used in making the multilayer foam control structures. Each layer was of the same composition. The control structures are represented in the Table as Samples 1 thru 3.

The film/foam composite structures were formed using a forming rod assembly and pull rolls as they emerged from the die. Samples 4–6 and the control foams were exposed to a pull roll rate of 2.8 meters per minute, sample 7 was exposed to a pull roll rate of 5.5 meters per minute, and sample 8 was exposed to a pull roll rate of 8.2 meters per minute. The increase in pull roll rate increased the number of layers per inch thickness of composite structure.

Both the composite and the control structures were subjected to an ignition resistance test. Though the test is not necessarily indicative of the flame retardancy of the structures in a actual fire situation, the test is useful in comparing the flame retardancy of foams in a controlled test environment. The test consisted of subjecting a 15.2 cm×2.5 cm×0.64 cm, horizontally placed sample to a micro-burner flame at one end for 3 seconds. A timer automatically starts when the burner is removed, and the time for extinguishment of the flame is recorded. The value reported is the average of 6 specimens tested for each sample. An average extinguishment time of less than 5 seconds is considered acceptable.

TABLE

| Sample # | Structure | Total Bromine wt % BR | Density $kg/m^3$ | FP Test Results (sec) ave. | std. dev. |
|---|---|---|---|---|---|
| 1* | foam/foam | 1.47 | 49.0 | 3.9 | 3.6 |
| 2* | foam/foam | 2.46 | 48.5 | 0.5 | 0.3 |
| 3* | foam/foam | 1.41 | 52.0 | 2.0 | 5.0 |
| 4 | film/foam | 0.96 | 72.3 | 2.2 | 1.5 |
| 5 | film/foam | 0.62 | 68.8 | 10.0 | 4.2 |
| 6 | film/foam | 1.22 | 80.0 | 1.5 | 1.3 |
| 7[a] | film/foam | 1.22 | 85.8 | 0.4 | 0.4 |
| 8[b] | film/foam | 1.22 | 103 | 0.1 | 0.1 |

*not an example of the present invention
[a]Pull roll increased from 2.8 m/min. to 5.5 m/min.
[b]Pull roll rate increased to 8.2 m/min. Two pieces held together were used for ignition test.
- total wt % BR indicates weight percent elemental bromine based upon the total weight of polystyrene in the film and foam layers.

While embodiments of the composite structure of the present invention have been shown with regard to specific details, it will appreciated that depending upon the manufacturing process and the manufacturer's desires, the present invention may be modified by various changes while still being fairly within the scope of the novel teachings and principles herein set forth.

What is claimed is:

1. A coextruded, fire-resistant, thermoplastic composite structure, comprising:
    a first layer of a foam of a thermoplastic material, the first layer having a blowing agent comprising water, the first layer being substantially free of brominated aliphatic fire retardants;
    a second layer of a thermoplastic material, the second layer having a quantity of a brominated aliphatic fire retardant sufficient to reduce the flammability of the composite structure, the first and second layers being adjacent each other.

2. The structure of claim 1, wherein the structure has a plurality of substantially alternating first and second layers.

3. The structure of claim 2, wherein the brominated fire retardant comprises about 0.4 to about 10 weight percent based upon the weight of the thermoplastic material in the structure.

4. The structure of claim 2, wherein the brominated fire retardant is hexabromocyclododecane.

5. The structure of claim 2, wherein the second layer is in the form of a film.

6. The structure of claim 2, wherein the second layer is substantially free of water.

7. The structure of claim 2, wherein the thermoplastic material is polystyrene.

8. The structure of claim 2, wherein the outer layers are second layers.

9. A composite thermoplastic flow melt suitable for expansion into a composite foam structure, comprising:
    a first stream layer of a flow melt of a thermoplastic material, the first stream layer having a blowing agent comprising water, the first stream layer being substantially free of brominated aliphatic fire retardants;
    a second stream layer of a flow melt of a thermoplastic material, the second stream layer having a quantity of a brominated fire retardant sufficient to reduce the flammability of the composite structure formed by expansion of the composite flow melt, the second stream layer being substantially free of water, the first and second stream layers being adjacent each other.

10. The composite flow melt of claim 9, wherein the composite flow melt comprises a plurality of substantially alternating first and second stream layers.

* * * * *